United States Patent
Lakshminarayanan et al.

(10) Patent No.: US 11,531,497 B2
(45) Date of Patent: Dec. 20, 2022

(54) DATA SCHEDULING REGISTER TREE FOR RADIX-2 FFT ARCHITECTURE

(71) Applicant: National Institute of Technology, Tamil Nadu (IN)

(72) Inventors: G. Lakshminarayanan, Tamil Nadu (IN); Antony Xavier Glittas, Tamil Nadu (IN); Mathini Sellathurai, Edinburgh (GB)

(73) Assignee: National Institute of Technology, Tamil Nadu (IN)

( * ) Notice: Subject to any disclaimer, the term of this patent is extended or adjusted under 35 U.S.C. 154(b) by 149 days.

(21) Appl. No.: 17/166,892

(22) Filed: Feb. 3, 2021

(65) Prior Publication Data

US 2021/0255804 A1 Aug. 19, 2021

(30) Foreign Application Priority Data

Feb. 19, 2020 (IN) .............................. 202041007125

(51) Int. Cl.
  *G06F 3/06* (2006.01)
  *G06F 17/14* (2006.01)
(52) U.S. Cl.
  CPC .......... *G06F 3/0659* (2013.01); *G06F 3/0604* (2013.01); *G06F 3/0629* (2013.01); *G06F 3/0673* (2013.01); *G06F 17/142* (2013.01)

(58) Field of Classification Search
  CPC .... G06F 3/0659; G06F 3/0604; G06F 3/0629; G06F 3/0673; G06F 17/142
  USPC ......................................................... 708/404
  See application file for complete search history.

(56) References Cited

U.S. PATENT DOCUMENTS

2012/0166507 A1* 6/2012 Son ........................ G06F 17/142
  708/404
2022/0004595 A1* 1/2022 Garrec .................... G06J 1/005

* cited by examiner

*Primary Examiner* — Allen C Wong
(74) *Attorney, Agent, or Firm* — Kelly & Kelley, LLP

(57) ABSTRACT

The present invention discloses a data scheduling register tree structure for radix-2 FFT architecture. The operation method of the proposed invention, there is no need for the Random Access Memory (RAM) to store the data; instead, shift registers with some multiplexers are enough to perform the memory operation with less hardware. There are three steps in the FFT computation such as input storage, data processing and output retrieval. The data processing step is further configured in four different operations. The number of operation mainly depends upon the size of the FFT, which is equal to $\log_2 N$ modes. During each operation, the DSRT changes its structure and these structures are basically MDC (Multi-path Delay Commutator) structures.

6 Claims, 3 Drawing Sheets

DATA SCHEDULING REGISTER TREE FOR RADIX-2 FFT ARCHITECTURE

FIELD OF THE INVENTION

The present invention relates to the data scheduling register tree structure for radix-2 FFT architecture, wherein Register Tree is proposed instead of RAM for FFT architecture. More particularly, in the present invention, the shift registers and multiplexers are used instead of RAM so that there is no need for a Random Access Memory (RAM) to store the data.

BACKGROUND OF THE INVENTION

Nowadays, the size of FFT architectures used in advanced wireless communication and in signal processing applications is very large. The LTE standard uses 2K size FFT architectures and DVBT2 standard uses FFT architectures whose sizes are up to 8K. In these FFT architectures, more than 90% of the total FFT area is occupied by the memory unit. Therefore, the memory unit in the FFT architectures should be area efficient. Hence, there is need of system, which reduces the area of the memory unit.

OBJECT OF THE INVENTION

The primary object of the present invention is to provide a data scheduling Register Tree for FFT architecture. The proposed memory module is designed on the bases of shift registers and multiplexers, which is defined as Data Scheduling Register Tree structure.

Another object of the present invention is to provide a data scheduling register tree structure for radix-2 FFT architecture, which avoids address decoder and addressing scheme in the implementation of a memory unit for the FFT architecture.

SUMMARY OF THE INVENTION

The following summary is provided to facilitate an understanding of some of the innovative features unique to the disclosed embodiments and is not intended for the full description of the invention. A full appreciation of the various aspects of the preferred embodiments disclosed herein can be gained by taking the entire specification, claims, drawings and abstract as a whole.

The instant invention is developed to meet a need that exists to a system and method of operation, namely Data Scheduling Register Tree structure, wherein the shift registers and multiplexers are used in FFT architecture instead of RAM for decreasing the area significantly.

The present invention is directed to a memory module designed based on the shift registers and multiplexers to perform the memory operation by using the DSRT (Data Scheduling Register Tree) structure with less amount of hardware.

In addition, the present invention, unlike the RAM, the DSRT does not require address decoder and complex addressing schemes to overcome memory conflict issues. Therefore, the convention RAM-based approach required 50% more area than the proposed DSRT approach.

In another aspect of the present invention for FFT architecture, the data is read/written from/to the RAM in a particular periodic order and the data are not accessed in random order. Hence, there is no need for a Random Access Memory (RAM) to store the data so that instead of RAM, the shift registers with some multiplexers is enough to perform the operation.

Other features and advantages of the present invention will become more apparent from the following detailed description, taken in conjunction with the accompanying drawings which illustrate, by way of example, the principles of the invention.

BRIEF DESCRIPTION OF THE ACCOMPANYING DRAWINGS

The drawings described herein are for illustrative purposes only of selected embodiments and not all possible implementations and are not intended to limit the scope of the present disclosure. The invention itself, however, both as to organization and method of operation, may best be understood by reference to the detailed description which follows taken in conjunction with the accompanying drawings in which.

DETAILED DESCRIPTION OF THE INVENTION

Figure 1:
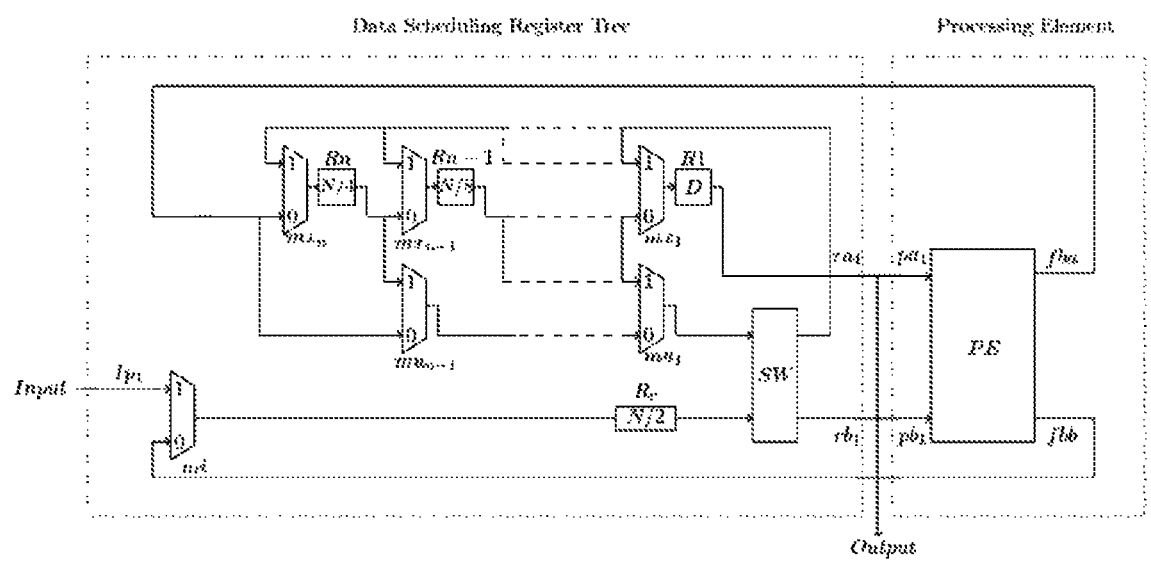
FIG. 1 is the representation of the N-point radix-2 FFT architecture with the data scheduling register tree unit of the system.

The preferred embodiments will now be described more fully with reference to the accompanying drawings. The embodiments are provided so that this disclosure will be thorough, and will fully convey the scope to those who are skilled in the art. Numerous specific details are set forth as specific components, devices, and methods, to provide a thorough understanding of preferred embodiments of the present disclosure. It will be apparent to those skilled in the art that specific details need not be employed, that preferred embodiments may be embodied in many different forms and that neither should be construed to limit the scope of the disclosure. In some example embodiments, well-known processes, well-known device structures, and well-known technologies are not described in detail.

Definitions of the Used Terms

The following definitions should be interpreted in consideration of the disclosure and for a better understanding of the present invention to a person skilled in the art. In the complete disclosure of the present invention, certain scientific and biotechnological terms appropriately used, having the same meaning as practically and theoretically understood by an ordinary person skilled in the art.

Fast Fourier transform (FFT):—The term "Fast Fourier transform" used herein refers to an algorithm that calculates the discrete Fourier transform (DFT) of some sequence and also reduces the number of computations needed for N points from $2N^2$ to $2N \lg N$, where lg is the base-2 logarithm.

Random-access memory (RAM):—The term "Random-access memory" used herein refers to a hardware device that allows information to be stored and retrieved on a computer.

Multipath Delay Commutator (MDC):—The term "Multipath Delay Commutator" used herein refers to an architecture that is the most straightforward approach to implement the radix-2 FFT algorithm using pipeline architecture.

Register:—The term "Register" used herein refers to a storage space for units of memory that are used to transfer data for immediate use by the CPU (Central Processing Unit) for data processing.

Shift Registers:—The term "Shift Registers" used herein refers to the digital memory circuitry found in devices such as calculators, computers, and data processing systems.

Multiplexer (or mux):—The term "Multiplexer" used herein refers to a way of selecting one out of many digital signals. It is a combinational circuit that has a maximum of 2n data inputs, 'n' selection lines and a single output line.

Abbreviations

FFT:—Fast Fourier transform
DSRT—Data Scheduling Register Tree
DIF:—Decimation in Frequency
MDC:—Multipath Delay Commutator In describing the preferred embodiments of the present invention, reference will be made herein to FIGS. 1, 2, and 3 of the drawings in which like numerals refer to like features of the invention.

One embodiment of the proposed invention includes an FFT architecture having a register tree instead of RAM and a hybrid that is in between in-placed and MDC (multi-path delay commutator) pipelined FFT architectures. The memory module is designed, based on the shift registers and multiplexers, which is a Data Scheduling Register Tree structure. The same memory operation can be performed using the DSRT (Data Scheduling Register Tree) structure but with less hardware. The DSRT does not require address decoder and complex addressing schemes to overcome memory conflict issues. Therefore, the convention RAM-based approach required 50% more area than the proposed DSRT approach.

In another embodiment of the present invention, an N-point FFT architecture is illustrated in FIG. 1. N can be substituted with any radix-2 FFT size and the architecture for the corresponding size can be obtained. The total number of multiplexer required for the design is $2 \log_2 N$ and N number of registers are required. R1(R1) has 1D register, R2(R2) has 1D register, R3(R4-3) has 2D registers, R4(R8-5) has 4D registers and finally, Rn(RN/2−(N/4+1)) has (N/4)D registers. Similarly, Rr(RN−(N/2+1)) has (N/2)D registers.

In the N-point FFT, there are $\log_2 N$ configurations and $\log_2 N$ is equal to n. The control signal of mi is set to "1" during data storage step and retrieval step and "0" while data processing step.

Figure 2:
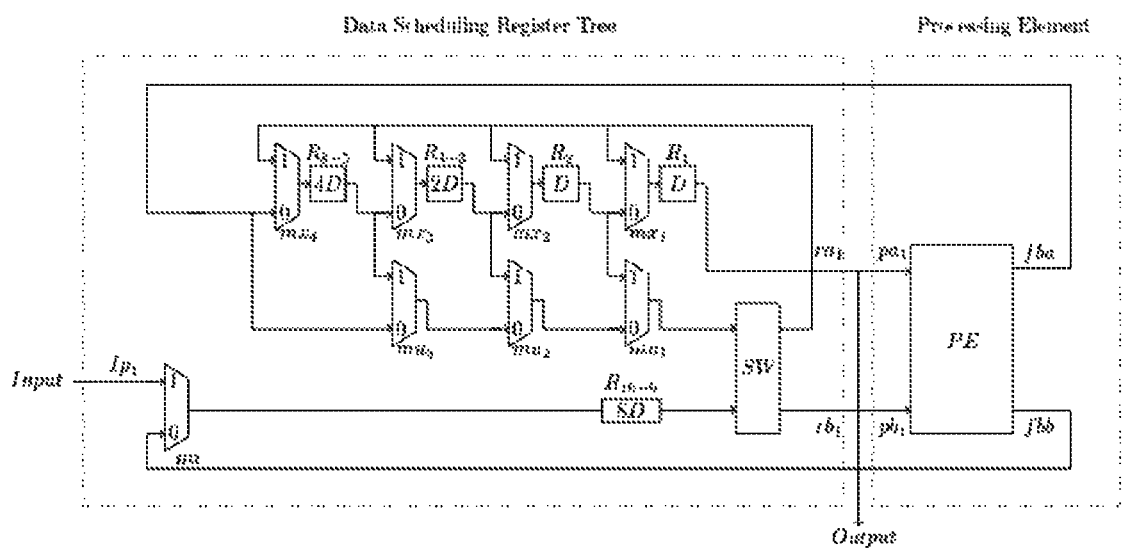
FIG. 2 is a block diagram of the system illustrating the 16-point FFT architecture with data scheduling register tree unit according to the preferred embodiment of the present invention.

Yet another embodiment of the present invention, FIG. 2 is showing an example of proposed DIF FFT architecture. In FIG. 2, there are two main units Processing Element (PE) and DSRT (Data Scheduling Register Tree). The Processing Element includes adder, subtractor and multiplier to perform the FFT butterfly operation. The Data Scheduling Register Tree has Shift Registers and multiplexers, which provides the data to PE in an appropriate order. The SW unit is a switch that has two modes of operations namely normal mode and swap mode. During the normal mode, the data at the lower input is passed to the lower output and the data at the upper input is passed to the upper output. During the swap mode, the data at the lower input is passed to the upper output and the data at the upper input is passed to the lower output.

The working of the architecture is followed by the three steps in the FFT Commutation operation such as input storage, data processing, and output retrieval.

Input storage:—In the input storage step the Ctrl (control signal) of mi, mx4 are set to "1", the control signals of the multiplexer (mx3, mx2, mx1) are set to "0" and the switch position is set as Swap. In the same step, the input data are fed from I p1 to the architecture through the multiplexer (mi) and the sixteen input data (x0, x1, x2, . . . x15) are stored in the shift registers D, D, 2D, 4D and 8D.

Data processing:—In the data processing step, the data stored in the registers (DSRT) are retrieved, processed by the PE and stored the output data back into the registers. This process is repeated to compute the output of every stage of the FFT. In total, this process repeated four times because it is a 16-point (24-point) FFT and has four stages. The SW position toggles between normal and swap mode depending upon the operation and control signals (Ctrl) of the multiplexer (mi, mx4, mx3, mx2, mx1, mu3, mu2, mu1) are also set depending upon the operation.

Output retrieval:—In the data retrieval step, the control signals to the multiplexer are set the same as that of input storage mode. Once the output is stored in the sixteen registers, R1 to R16, they are retrieved from the ra1 line which is connected to pa1. While the output data of the current set are retrieved, the next set of input data is stored into the registers.

According to an embodiment of the invention, the inputs x15 to x0 are first stored in the registers R16 to R1 respectively. The next step is the data processing and it has four different operations. The number of operations depends upon the size of the FFT, which is equal to log 2 N modes. Since the size of the proposed FFT is 16-point, it has four different operations. During each operation, the DSRT changes its structure and these structures are basically MDC (Multi-path Delay Commutator) structures.

Figure 3:
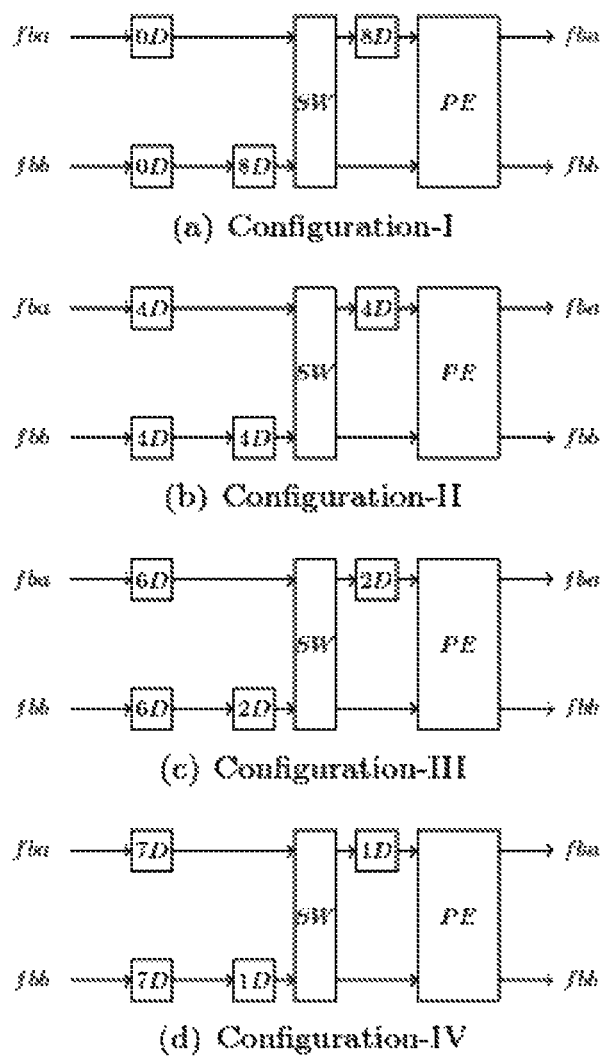
FIG. 3 is a block diagram of the configuration of Data Scheduling Register Tree.

According to the present invention, there are four different configurations of DSRT are illustrated in FIG. 3. The data processing step has four different configurations for the operation of the FFT computation. In all of the configurations, there are two inputs and two outputs designated as fba and fbb because input and output are forming a closed path.

Configuration-I

In the configuration-,I the Ctrl of mi=0, mx4=1, mx3=0, mx2=0, mx1=0, mu3=0, mu2=0, mu1=0 and the switch is in normal position. The equivalent structure as shown in FIG. 3a, 0D refers to no delay/register. The data x0 to x7 is stored in the upper 8D registers and the data x8 to x15 are stored in the lower 8D registers. This configuration remains for the first eight (1-8) clock cycles during the data processing step and provides the inputs for the butterfly operations of the first stage of the 16-point radix-2 DIF FFT. The outputs of the first stage are stored back to the upper and lower 8D registers via f ba and f bb.

Configuration-II

As per the configuration-II, the Ctrl of mi=0, mx4=0, mx3=1, mx2=0, mx1=0, mu3=1, mu2=0, mu1=0. The equivalent structure is illustrated in FIG. 3b. This configuration remains for the second eight (9-16) clock cycles and provides the inputs (outputs of the first stage) to the PE to perform the butterfly operations of the second stage of FFT DFG. The outputs of the second stage are stored back to the registers via f ba and f bb. The switch is in swap position during 9 to 12 clock cycles and normal position during 13 to 16 clock cycles.

Configuration-III According to the configuration-III, the Ctrl of mi=0, mx4=0, mx3=0, mx2=1, mx1=0, mu3=0, mu2=1, mu1=0. The equivalent structure is illustrated in FIG. 3c. This configuration remains for the third eight (17-24) clock cycles and provides the inputs (outputs of the second stage) to perform the butterfly operations of the third stage. The outputs of the third stage are stored back to the registers via fba and fbb. The switch is in swap position during 17 & 18, 21 & 22, clock cycles and normal position during 19 & 20, 23 & 24 clock cycles.

Configuration-IV

In the configuration-IV, the Ctrl of mi=0, mx4=0, mx3=0, mx2=0, mx1=1, mu3=0, mu2=0, mu1=1. The equivalent structure is shown in FIG. 3d. This configuration remains for the fourth eight (25-32) clock cycles and provides the inputs (outputs of the third stage) to perform the for the butterfly operations of the fourth stage. The outputs of the fourth stage are stored back to the registers via fba and fbb. The switch is in swap position during 25, 27, 29, 31 clock cycles and normal position during 26, 28, 30, 32 clock cycles.

During configuration-I, the control signal to mxn is 1 and all the control signals of mx and mu are zero. During configuration-II, the control signals of mxn-1 and mun-1 are 1 and all the control signals of mx and mu are zero and the control signal of SW toggles for every N/4 clock cycles. During configuration-III, the control signals of mxn-2 and mun-2 are 1 and all the control signals of mx and mu are zero and the control signal of SW toggles for every N/8 clock cycles. During configuration-IV, the control signals of mxn-3 and mun-3 are 1 and all the control signals of mx and mu are zero and the control signal of SW toggles for every N/16 clock cycles. This goes up to configuration-n during which the control signals of mx1 and mu1 are 1 and all the control signals of mx and mu are zero and the control signal of SW toggles for every one clock cycle.

The invented data scheduling register tree structure for radix-2 FFT architecture provides the following practical uses and benefits:
  (i) The method includes register tree structure for the storage of the data instead of RAM.
  (ii) The memory module designed based on the shift registers and multiplexers as a result, the same memory operation can be performed using the DSRT (Data Scheduling Register Tree) structure but with less hardware.
  (iii) Unlike RAM the Data Scheduling Register Tree (DSRT) does not require address decoder and complex addressing schemes to overcome memory conflict issues.

Although a preferred embodiment of the invention has been illustrated and described, it will at once be apparent to those skilled in the art that the invention includes advantages and features over and beyond the specific illustrated construction. Accordingly, it is intended that the scope of the invention be limited solely by the scope of the hereinafter appended claims, and not by the foregoing specification, when interpreted in light of the relevant prior art.

LIST OF REFERENCE NUMERALS (1) Multiplexers—mi, $mx_1$, $mx_2$, $mx_3$, $mx_4$, $mu_1$, -$mu_3$
(2) Registers—$R_1$ to $R_{16}$
(3) Shift registers—D, D, 2D, 4D and 8D
(4) Input data—$IP_1$

We claim:

1. A data scheduling register tree (DSRT) structure for Radix-2 Fast Fourier Transform (FFT) architecture comprising of:
  a plurality of shift registers ($R_1$ to $R_{16}$); and
  a plurality of multiplexers (mi, $mx_1$-$mx_4$, $mu_1$-$mu_3$) in place of Random Access Memory to store the data in the 16 point FFT architecture,
  wherein the memory operation is performed by the data scheduling Register tree (DSRT),
  which can be substituted with any radix-2 FFT size for the architecture to obtain the corresponding size.

2. The data scheduling Register tree (DSRT) structure for 16-point Radix-2 as claimed in claim 1, wherein the total number of the multiplexers required for design N-point Radix-2 FFT is 2 $\log_2$N and R1($R_1$) has 1D register, R2($R_2$) has 1D register, R3($R_{4-3}$) has 2D registers, R4($R_{8-5}$) has 4D registers and so on up to Rn($R_{N/2-(N/4+1)}$) has (N/4)D registers, wherein N is the number of registers required, which can be substituted with any radix-2 FFT size for the architecture to obtain the corresponding architecture.

3. The data scheduling Register tree (DSRT) structure for Radix-2 as claimed in claim 1, wherein the 16-point FFT having four configurations (I to IV) and N-point FFT has $\log_2$N configurations (1 to log2N), wherein N is the number of registers required.

4. The data scheduling Register tree (DSRT) structure for 16-point Radix-2 as claimed in claim 3, wherein the N-point Radix-2 FFT architecture is characterized by the following configurations:
  (a) during configuration-I, the control signal to multiplexers ($mx_n$) is 1 and all other control signals of multiplexers (mx and mu) are zero;
  (b) during configuration-II, the control signals of multiplexers ($mx_{n-1}$ and $mu_{n-1}$) are 1 and all other control signals of multiplexers (mx and mu) are zero and the control signal of SW toggles for every N/4 clock cycles;
  (c) during configuration-III, the control signals of multiplexers ($mx_{n-2}$ and $mu_{n-2}$) are 1 and all other control signals of multiplexers (mx and mu) are zero and the control signal of SW toggles for every N/8 clock cycles;
  (d) during configuration-IV, the control signals of multiplexers ($mx_{n-3}$ and $mu_{n-3}$) are 1 and all other control signals of multiplexers (mx and mu) are zero and the control signal of SW toggles for every N/16 clock cycles;
  (e) wherein N-point Radix-2 FFT architecture goes up to configuration-n during which the control signals of $mx_1$ and $mu_1$ are 1 and all other control signals of mx and mu are zero and the control signal of SW toggles for everyone clock cycle, wherein n=$\log_2$N.

5. The data scheduling Register tree (DSRT) structure for Radix-2 as claimed in claim 1, wherein the operation of the 16-point FFT architecture is further comprises the following steps:
  (a) input storage step comprises of the control signal of $m_i$, $mx_4$ is set to "1", the control signals of $mx_3$, $mx_2$, $mx_1$ are set to "0" and the switch position is set as Swap, wherein the input data are fed from $Ip_1$ to the architecture through the multiplexer (mi) and the input data ($x_0$, $x_1$, $x_2$, ... $x_{15}$) are stored in the shift registers (D, D, 2D, 4D and 8D);
  (b) data processing step comprises of retrieving of the data stored in the registers (DSRT) and processed by the processing element and stored the output data back into the shift registers, characterized by the switch (SW) position is toggling between normal and swap mode depending upon the operation and control signals (Ctrl) of multiplexer ($m_i$, $mx_4$, $mx_3$, $mx_2$, $mx_1$, $mu_3$, $mu_2$, $mu_1$) are also set depending upon the operation;

(c) data retrieval step comprises of the control signals to the multiplexer are set same as the input storage mode, wherein the output are stored in the sixteen registers, $R_1$ to $R_{16}$ and further the output data are retrieved while the output data of the current set are retrieved, the next set of input data are stored into the registers, wherein, the next set of input data stored into the register once the output data of the current set are retrieved.

6. The data scheduling Register tree (DSRT) structure for Radix-2 as claimed in claim 5, wherein the control signal of the multiplexer (mi) is set to "1" during the data storage step and in the data retrieval step and set to "0" during the data processing step.

* * * * *